(12) United States Patent
Idaka et al.

(10) Patent No.: US 8,955,635 B2
(45) Date of Patent: Feb. 17, 2015

(54) SADDLE-RIDING TYPE AUTOMOTIVE VEHICLE

(71) Applicant: Kawasaki Jukogyo Kabushiki Kaisha, Hyogo (JP)

(72) Inventors: Kenji Idaka, Akashi (JP); Shiken Hayashi, Kobe (JP); Yota Katsukawa, Himeji (JP); Yoshitaka Awazu, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/037,129

(22) Filed: Sep. 25, 2013

(65) Prior Publication Data
US 2014/0090919 A1    Apr. 3, 2014

(30) Foreign Application Priority Data

Sep. 28, 2012 (JP) ................. 2012-215871

(51) Int. Cl.
*B60K 5/12* (2006.01)
*B62K 11/04* (2006.01)

(52) U.S. Cl.
CPC .................................... *B62K 11/04* (2013.01)
USPC ....................... 180/299; 180/300; 296/203.01

(58) Field of Classification Search
CPC ...... B60K 5/12; B60K 5/1208; B60K 5/1216; B60K 5/1241; B60K 5/1275
USPC ........ 180/291, 299, 300; 296/193.01, 193.02, 296/203.01, 205, 203.02, 203.03
See application file for complete search history.

(56) References Cited

U.S. PATENT DOCUMENTS

| | | | | |
|---|---|---|---|---|
| 6,315,072 | B1 * | 11/2001 | Brown et al. | 180/228 |
| 6,758,296 | B2 * | 7/2004 | Inaoka et al. | 180/228 |
| 8,381,863 | B2 * | 2/2013 | Hayashi et al. | 180/291 |

FOREIGN PATENT DOCUMENTS

| | | |
|---|---|---|
| JP | 2002-362462 | 12/2002 |
| JP | 2010058762 A * | 3/2010 |

* cited by examiner

*Primary Examiner* — John Walters (57) ABSTRACT

A motorcycle frame assembly (FR) for a motorcycle includes a main frame (1), which extends from above a combustion engine (E) in a direction rearwardly, and a subframe (4) having front and rear end portions connected with the main frame (1) and also having an intermediate portion positioned laterally outside of a cylinder block (26) of the combustion engine (E). The combustion engine (E) is fixed to a motorcycle frame assembly (FR) by means of first, second and third engine mounting areas (M1, M2, M3). The first engine mounting area (M1) is provided in the intermediate portion of the subframe (4) and, also, a damping unit (72) for suppressing vibrations of a to-be-damped region (76) is provided in the to-be-damped region (76) provided at a location remote from the first engine mounting area (M1) in the subframe (4).

5 Claims, 7 Drawing Sheets

SADDLE-RIDING TYPE AUTOMOTIVE VEHICLE

CROSS REFERENCE TO THE RELATED APPLICATION

This application is based on and claims Convention priority to Japanese patent application No. 2012-215871, filed Sep. 28, 2012, the entire disclosure of which is herein incorporated by reference as a part of this application.

BACKGROUND OF THE INVENTION

1. Field of the Invention

The present invention relates to a saddle-riding type automotive vehicle equipped with a damping unit for preventing a vehicle body frame assembly from vibrating under the influence of vibrations generated by a combustion engine.

2. Description of Related Art

In a saddle-riding type automotive vehicle such as, for example, a motorcycle, a motorcycle combustion engine is supported on a plurality of engine mounting areas provided in a substantially elongated vehicle body frame assembly. In this respect, see, for example, the JP Laid-open Patent Publication No. 2002-362462. In such a saddle-riding type automotive vehicle, vibration generated by the combustion engine are transmitted to the vehicle body frame assembly through the engine mounting areas and the elongated vehicle body frame assembly assumes the role of a loudspeaker enough to amplify the vibrations from the combustion engine. In the event that those vibrations are so significant as to exceed a level higher than a predetermined level, abnormal noises often result in.

It has, however, been found that if, for example, the design of the vehicle body frame assembly is modified to alter the rigidity, the mass and others of the vehicle body frame assembly, there is the possibility that the feeling during the traveling may be lowered and is therefore undesirable.

SUMMARY OF THE INVENTION

The present invention has been devised in view of the problems and inconveniences discussed hereinabove, and is intended to provide a saddle-riding type automotive vehicle in which the feeling during the travel is not lowered and vibrations of the vehicle body frame assembly are restrained to suppress the generation of abnormal noises.

In order to accomplish the foregoing object of the present invention, there is provided in accordance with the present invention a saddle-riding type automotive vehicle of a type having a vehicle combustion engine mounted on an engine mounting area of a vehicle body frame assembly, in which at a to-be-damped region in the vehicle body frame assembly, which region is remote from the engine mounting area, a damping unit is provided to absorb vibratory energies from the combustion engine to thereby suppress vibrations of the to-be-damped region.

According to the present invention, the vibratory energies from the combustion engine are absorbed by the damping unit and, therefore, the vibrations occurring in the to-be-damped region of the vehicle body frame assembly can be suppressed to thereby suppress the generation of the abnormal noises attributable to the vibrations. Also, the mere provision of the damping unit does not alter the rigidity and/or the mass of the vehicle body frame assembly and, therefore, the feeling during the travel will not be lowered.

In a preferred embodiment of the present invention, the damping unit preferably referred to above makes use of a damping member to damp a displacement of the to-be-damped region to thereby suppress the vibrations occurring in the to-be-damped region. According to this feature, the vibratory energies from the combustion engine are absorbed and are then converted into heat energies of an internal friction of the damping member and, accordingly, the displacement of the to-be-damped region of the vehicle body frame assembly is attenuated. Therefore, a vibration reducing effect can be obtained over a wide range of frequencies other than the resonance frequency, with the consequence that the generation of the abnormal noises can be suppressed effectively.

In another preferred embodiment of the present invention, where the vehicle body frame assembly includes a main frame, which extends from above the combustion engine in a direction rearwardly, and a subframe having anteroposterior ends, connected with the main frame assembly, and an intermediate portion which is positioned laterally outside a cylinder block of the combustion engine. In such case, one of a plurality of engine mounting areas is provided in the intermediate portion of the subframe, and the damping unit is provided in the subframe. The amplitude is apt to increase at the intermediate portion of the subframe that is supported at both ends. According to this feature, the amplitude of the subframe is suppressed by the damping unit, and therefore, the generation of the abnormal noises resulting from the vibrations of the subframe can be suppressed. Also, even where the degree of freedom of design of the subframe is low in view of the desires that the appearance and the traveling feeling should be maintained, the vibrating sounds of the subframe can be suppressed effectively.

In a further preferred embodiment of the present invention, the damping unit referred to above preferably includes a rubber member having a damping capability, and the rubber member is disposed between the vehicle body frame assembly and the combustion engine in a compressed fashion. According to this feature, with a simplified structure, the vibrations occurring in the vehicle body frame assembly can be suppressed.

In a still further preferred embodiment of the present invention, the damping unit referred to above is employed in the form of a microparticulate impact damper having microparticulates movably filled within the vehicle body frame assembly. According to this feature, with the vibratory energies from the combustion engine converted into the kinetic energies of particulates the vibrations occurring in the to-be-damped region of the vehicle body frame assembly can be suppressed, and therefore, the vibrations can be suppressed with the damping unit and the combustion engine held in a non-contact condition. Also, where the particulates are made of metal that is easy to manufacture, the performance is stable as compared with that of rubber and it is possible to secure the damping capability while influences, which would be brought about by change in temperature, humidity, aging and others, are prevented.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described in detail with particular reference to the accompanying drawings. Before the description of the present invention proceeds, it is to be noted that the terms "left" and "right" are used to denote opposite positions or directions, respectively, relative to a motorcycle rider or motorist then occupying a motorcycle rider's seat and looking forwards in a direction parallel to the longitudinal sense of the motorcycle.

Figure 1:
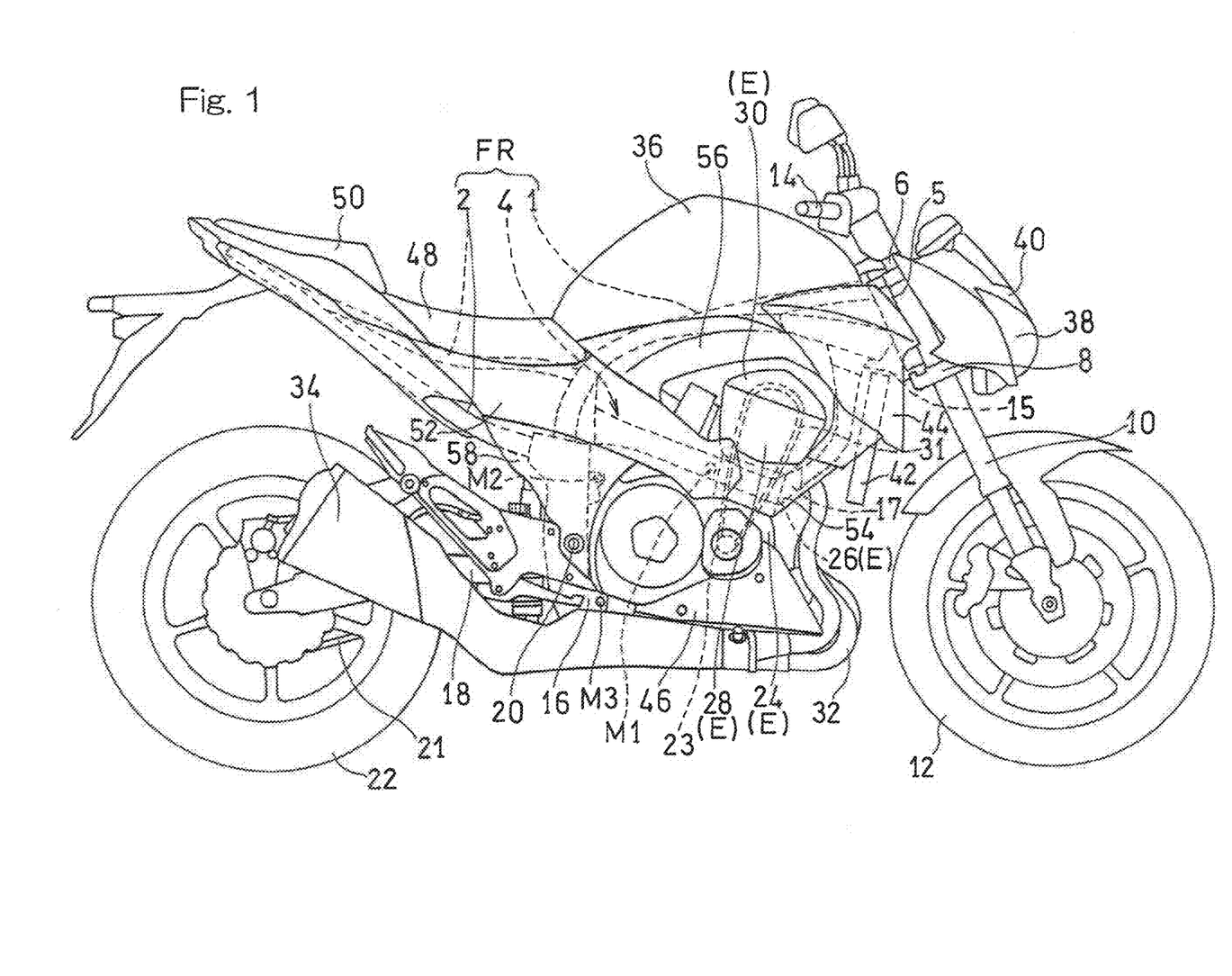
FIG. 1 is a side view showing a motorcycle, which is one kind of saddle-riding type automotive vehicles according to a preferred embodiment of the present invention.

Referring to FIG. 1 showing a right side view of a motorcycle, which is one kind of a saddle-riding type automotive vehicle pertaining to the preferred embodiment of the present invention, the illustrated motorcycle utilizes a motorcycle body frame assembly FR including a main frame 1 forming a front half portion, a rear frame 2 connected with a rear portion of the main frame 1 and forming a rear half portion, and a subframe 4 (left and right subframes 4L and 4R) extending from a front portion of the main frame 1 to the rear portion of the main frame 1.

A head tube 5 is fitted to a front end of the main frame 1, and an upper bracket 6 and a lower bracket 8 are supported by the main frame 1 through a steering shaft (not shown) that is rotatably inserted into the head tube 5. A front fork assembly 10 is supported by the upper and lower brackets 6 and 8 and a front wheel 12 is rotatably supported at a lower end portion of the front fork assembly 10. The upper bracket 6 at an upper end portion of the front fork assembly 10 has a steering handlebar 14 mounted thereon for angular movement together with the front fork assembly 10.

The main frame 1 has a rear end portion thereof, which is inclined rearwardly slantwise, and a swingarm bracket 16 is formed at this rear end portion of the main frame 1. A swingarm 18 has its front end portion pivotally supported by the swingarm bracket 16 through a pivot shaft 20, and a rear wheel 22 is rotatably supported by a rear end portion of this swingarm 18. A motorcycle combustion engine E, which is a drive source of the motorcycle, is mounted on a substantially intermediate portion of the main frame 1 with respect to the longitudinal sense of the motorcycle, in a fashion tilted forwardly. The rear wheel 22 referred to above is driven by the combustion engine E through a transmission member 21 such as, for example, a substantially endless chain. The combustion engine E referred to above is supported by the motorcycle body frame assembly FR at three, first to third engine mounting areas M1, M2 and M3.

The subframe 4 includes a first subframe piece 15, extending downwardly from the front portion of the main frame 1, and a second subframe piece 17 extending rearwardly from a lower end portion of the first subframe piece 15, and reinforces the main frame 1. Specifically, the second subframe piece 17 has a front end portion connected with the first subframe piece 15 so as to extend from front to rear of the combustion engine E at an outer side of the combustion engine E and is then connected with a rear portion of the main frame 1.

An intermediate portion of the second subframe piece 17 in an anteroposterior direction is provided with the first engine mounting area M1 to which a rear portion of a cylinder block 26 of the combustion engine E is fitted. The second engine mounting area M2 is provided in an upper end portion of the swingarm bracket 16 and a rear end upper portion of the combustion engine E is fitted to the second engine mounting area M2. The third engine mounting area M3 is provided in a lower end portion of the swingarm bracket 16 and a rear end lower portion of the combustion engine E is fitted to the third engine mounting area M3.

Each of the engine mounting areas M1 to M3 is formed with an insertion hole (not shown). When a bolt (not shown) is inserted into this insertion hole and is subsequently firmly fastened to a corresponding threaded hole (not shown) defined in the combustion engine E, such combustion engine E is secured to the motorcycle body frame assembly FR. In the second engine mounting area M2, the combustion engine E is fixed to the motorcycle body frame assembly FR by means of a rubber mount through an elastic member such as, for example, a rubber element. In the first and third engine mounting areas M1 and M3, the combustion engine E is fastened to the motorcycle body frame assembly FR by means of respective rigid mounts not through any elastic member.

The motorcycle combustion engine E referred to above is an internal combustion engine and, in the practice of this preferred embodiment is a parallel multi-cylinder, water cooled internal combustion engine such as, for example, a four-cylinder, four-stroke internal combustion engine. Specifically, the combustion engine E referred to in describing the preferred embodiment includes an open deck type cylinder block structure in which cylinders and a block outer wall in the cylinder block are separated from each other by means of a water jacket.

The combustion engine E includes a crankcase 24 having a crankshaft 23 rotatably supported therein, the cylinder block 26 protruding upwardly from the crankcase 24, a cylinder head 28 mounted atop the cylinder block 26, and a head cover 30 fitted to an upper portion of the cylinder head 28 so as to enclose the cylinder head 28. The head cover 30 referred to above encloses cam mechanisms (not shown) for intake and exhaust valves. A cam chain 31 for transmitting a power of the combustion engine E to the intake and exhaust valves is disposed on a right side of the combustion engine E. Four exhaust pipes 32, each communicated with the respective cylinder defined in the cylinder block 26, are connected with a front surface of the cylinder head 28, and those exhaust pipes 32 are, after having been markedly curved forwards and then extended in a rearward direction, merged together at a location below the combustion engine E and are then fluid connected with a muffler 34 disposed on a right side of the rear wheel 22.

A fuel tank 36 is disposed atop the main frame 1. A headlamp unit 38 is supported by a front surface of the front fork assembly 10. A front cowl 40, made of a resinous material, is supported by the headlamp unit 38 so as to cover an upper front area of the front fork assembly 10.

At a location forwardly above the combustion engine E, a radiator 42 for dissipating an engine coolant medium such as water is disposed in a fashion tilted forwards. Left and right paired cowls 44, which extend from laterally upwardly of the radiator 42 towards respective upper end portions of the subframe 4 and laterally outwardly of the front portion of the main frame 1, are disposed and supported by the main frame 1. Left and right paired lower cowls 46, each made of a resinous material, are supported beneath the crankcase 24 of the combustion engine E.

A seat assembly comprised of a rider's seat 48 and a fellow passenger's seat 50 is mounted on an upper portion of the rear frame 2. A side covering 52 extends from below the rider's seat 48 to a rear portion of the cylinder block 26 of the combustion engine E so as to permit such side covering 52 to enclose the second subframe piece 17 from lateral outside. A subframe covering 54 is supported by the subframe 4 so as to extend from a front end portion of the side covering 52 to a lower portion of the side cowl 44 to thereby cover the first frame piece 15 from lateral outside.

At upper and lower positions with the side covering 52 intervening therebetween, an upper frame covering 56 and a lower frame covering 58 are disposed. The upper frame covering 56 referred to above extends from the side cowl 44 to the side covering 52 along a lower edge of the fuel tank 36 so as to cover the main frame 1 from lateral outside. On the other hand, the lower frame covering 58 referred to above extends downwardly from the side covering 52 so as to cover the swingarm bracket 16 from lateral outside.

Figure 2:
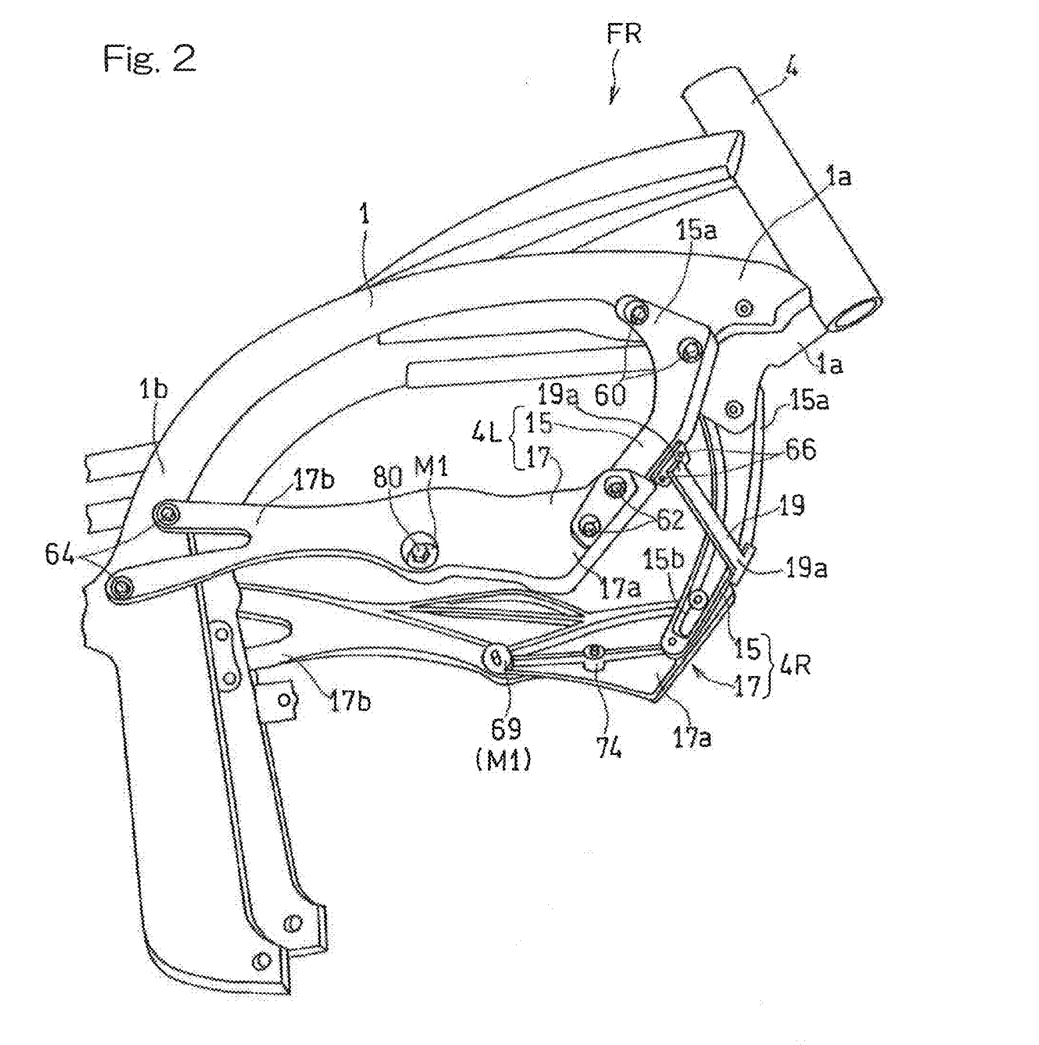
FIG. 2 is a perspective view showing, on an enlarged scale, a front portion of a vehicle body frame assembly of the motorcycle.

The main frame 1 and the first and second subframe pieces 15 and 17 are foundry pieces made of a steel material. As best shown in FIG. 2, the first subframe piece 15 has an upper end portion 15a connected with a front end portion 1a of the main frame 1. The second subframe piece 17 on the other hand extends rearwardly from a lower end portion 15b of the first subframe piece 15, terminating at a rear portion 1b of the main frame 1. The left and right first subframes 15 and 15 are connected together by means of a reinforcement member 19 disposed forwardly thereof and extending in a direction widthwise of the motorcycle body.

The upper end portion 15a of the first subframe piece 15 is overlapped with an outer side surface, which will becomes a motorcycle body outer side of the front end portion 1a of the main frame 1, and is connected with the main frame 1 by means of a bolt 60 inserted from laterally outside of the motorcycle body. Also, a front end portion 17a of the second subframe piece 17 is overlapped with an outer side surface of the lower end portion 15b of the first subframe piece 15 and is connected with the first subframe piece 15 by means of a bolt 62 inserted from laterally outside of the motorcycle body. Further, a rear end portion 17b of the second subframe piece 17 is overlapped with an outer side face of the rear portion 1b of the main frame 1 and is connected with the main frame 1 by means of a bolt 64 inserted from laterally outside of the motorcycle body. Yet, the reinforcement member 19 has its left and right end portions 19a and 19a overlapped with respective front surfaces of the left and right first subframe pieces 15 and 15 and then connected with the subframe 4 by means of bolts 66 inserted from front of the motorcycle body. In this way, the left and right subframes 4R and 4L are removably fixed to the main frame 1.

Connection between the front end portion 1a of the main frame 1 and the upper end portion 15a of the first subframe piece 15 is accomplished by inserting the bolts 60, each having a male thread formed at a tip end portion thereof, into corresponding bolt insertion holes (not shown), defined in the first subframe piece 15, and then threading those bolts 60 into respective threaded holes (not shown) defined in the main frame 1.

Connection between the lower end portion 15b of the first subframe piece 15 and the front end portion 17a of the second subframe piece 17 is accomplished by inserting the bolts 62 into a first bolt insertion holes 68 (FIG. 3), defined in the second subframe piece 17, and then threading those bolts 62 into respective threaded holes (not shown) defined in the first subframe piece 15.

Connection between the rear end portion 1b of the main frame 1 and the rear end portion 17b of the second subframe piece 17 is accomplished by inserting the bolts 64 into a second bolt insertion holes 70 (in FIG. 3) defined in the second subframe piece 17, and then threading those bolts 64 into respective threaded holes (not shown) defined in the main frame 1.

Figure 3:
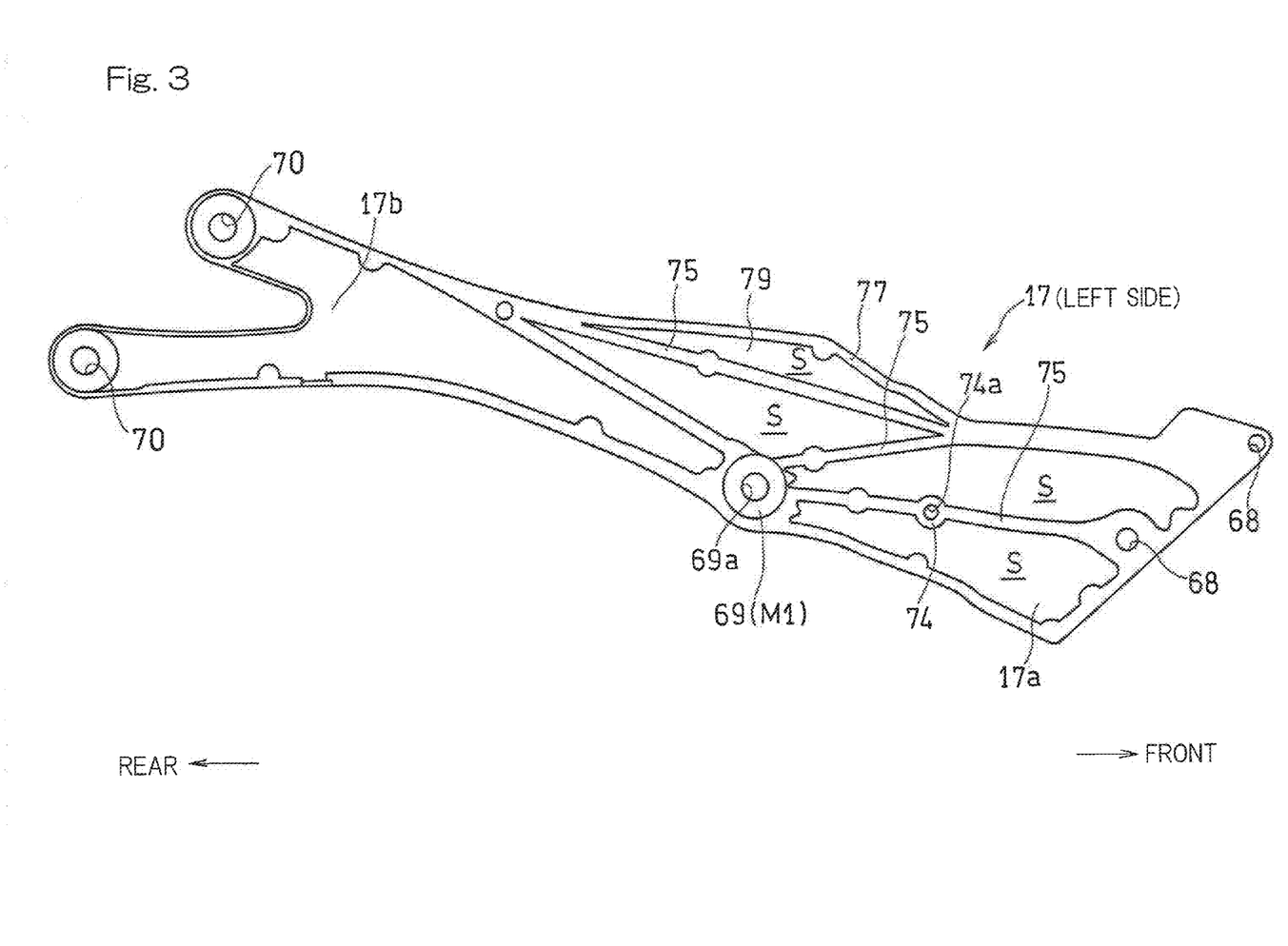
FIG. 3 is a diagram showing a left subframe of the vehicle body frame assembly as viewed in a direction inwardly of the motorcycle.

As shown in FIG. 3 showing the left second subframe piece 17 as viewed from inside of the motorcycle body, the front end portion 17a, which is one lengthwise end portion, of the second subframe piece 17 is formed with the previously mentioned two first bolt insertion holes 68 that are positioned one above the other. On the other hand, the rear end portion 17b of the second subframe piece 17 is ramified upwardly and downwardly into two arms with the second bolt insertion holes 70 defined therein. A lengthwise intermediate portion of the second subframe piece 17 is formed with a boss portion 69 that defines the first engine mounting area M1. A third bolt insertion hole 69a is formed in this boss portion 69. At a location forwardly distant from the first engine mounting area M1, a damping unit mounting portion 74 for mounting a damping unit 72 as will be described in detail subsequently is provided.

The inside of the second subframe piece 17 is provided with a plurality of reinforcement ribs 75 that extends radially from the boss portion 69. The inside of this second subframe piece 17 is formed with spaces S each bound by the neighboring reinforcement ribs 75, adjacent peripheral walls 77 and corresponding side walls 79. The damping unit mounting portion 74 is comprised of a boss provided in the reinforcement ribs 75 that connect between the boss portion 69 and the first bolt insertion hole 68 on a lower side. The damping unit mounting portion 74 has an internally threaded blind hole 74a that opens towards the inside of the motorcycle body.

As described above, with the damping unit mounting portion 74 provided in the reinforcement ribs 75, there is no need to use any extra boss. The damping unit mounting portion 74 is positioned substantially intermediate between the boss portion 69 and the first bolt insertion hole 68 on a front side. The right second subframe piece 17 is different from the left second subframe piece 17 in that no damping unit mounting portion 74 is provided, but has a structure similar to the right second subframe piece 17 other than this difference.

Figure 4:
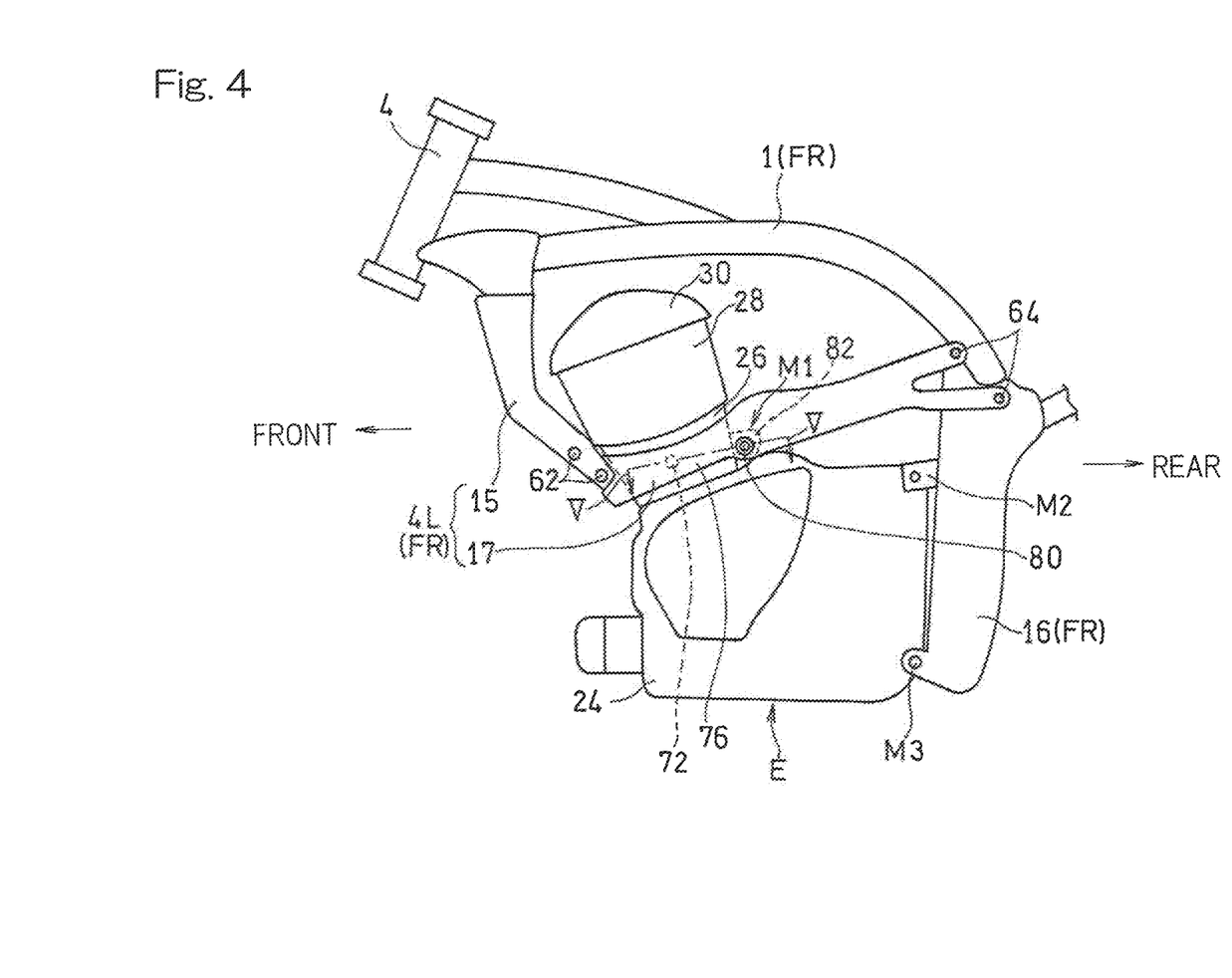
FIG. 4 is a side view showing the front portion of the vehicle body frame assembly and a combustion engine of the motorcycle.

As shown in FIG. 4, a to-be-supported portion 82 is provided in the rear portion of the cylinder block 26 of the combustion engine E. As viewed from lateral side, the first engine mounting area M1 lies at a position, where it overlaps the to-be-supported portion 82 rearwardly of the cylinder head 26 and the damping unit 72 is positioned at an intermediate portion of the cylinder head 26 in the anteroposterior direction. The damping unit 72 is operable to suppress vibrations inputted to the subframe 4L from the combustion engine E through the first engine mounting portion M1. In other words, the site of the subframe 4L, at which the damping unit 72 is provided, is a to-be-damped region 76 where vibrations are suppressed. In the illustrated embodiment now under discussion, the damping unit 72 referred to above is operable to suppress vibrations of the to-be damped region 76 by absorbing vibratory energies from the combustion engine E. Specifically, the damping unit 72 suppresses the vibrations, induced in the to-be-damped region 76, with the use of a damping member 78, as will be detailed later, for attenuating a displacement of the to-be-damped region 76.

Figure 5:
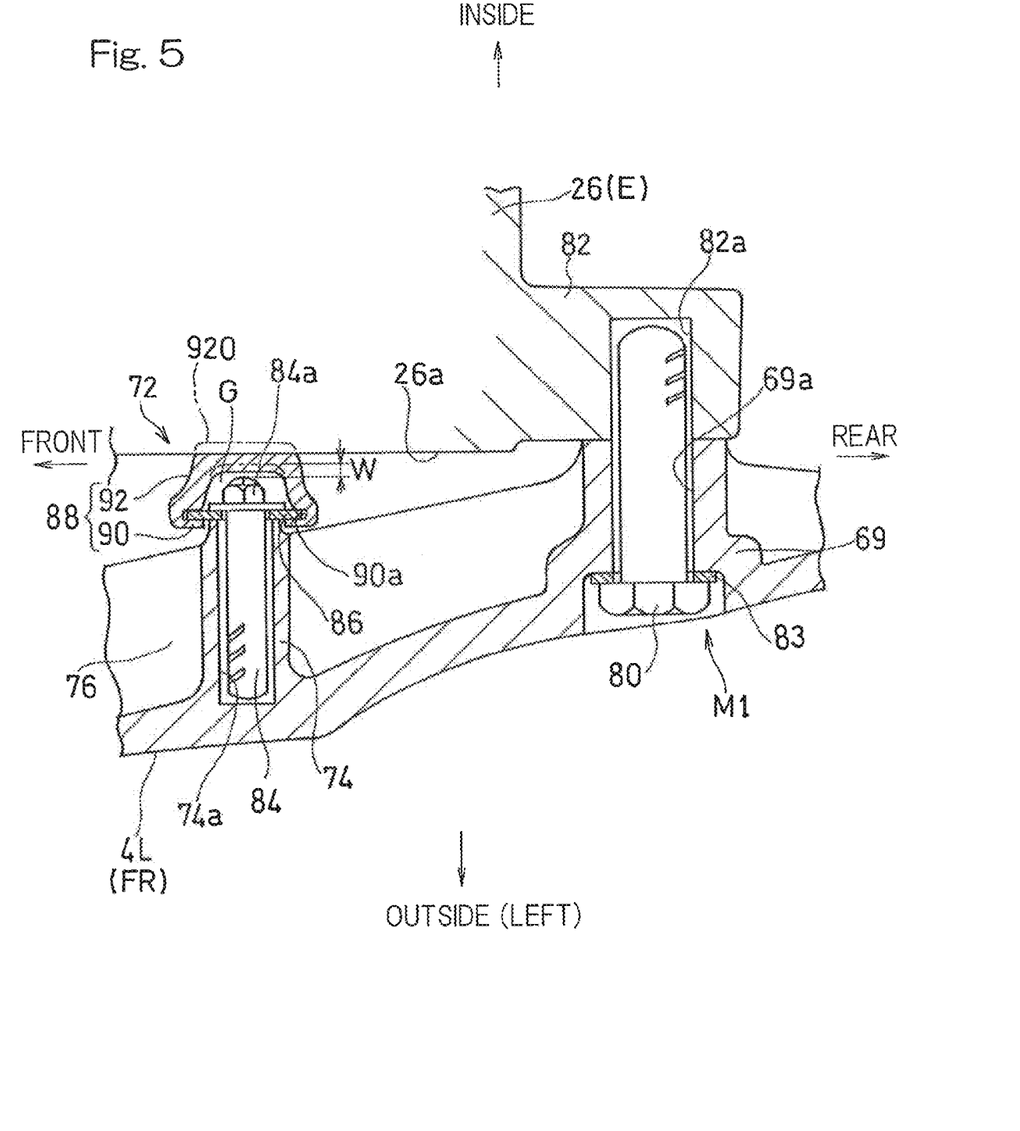
FIG. 5 is a cross sectional view, on an enlarged scale, taken along the line V-V in FIG. 4.

As shown in FIG. 5, at the first engine mounting area M1, a bolt 80 is inserted from lateral side into the third bolt insertion hole 69a in the boss portion 69 and is then fastened to a threaded hole 82a provided in the to-be-supported portion 82 of the cylinder block 26. By so doing, the combustion engine E is supported by the subframe 4L. In this first engine mounting area M1, a damping washer 83 having a damping function is interposed between the bolt 80 and the boss portion 69 to suppress transmission of the vibrations of the combustion engine E to the subframe 4L. The damping washer 83 is made of a metallic material capable of absorbing vibrations and exhibits a damping effect by converting the vibrations into heat energies within the metallic material thereof. Although material for the damping washer 83 is, for example, manganese steel, it is not necessarily limited thereto.

The damping unit 72 includes a bolt 84 adapted to be engaged in a threaded hole 74a in the damping unit mounting portion 74, a washer 86 interposed between the damping unit mounting portion 74 and the bolt 84, and a rubber member 88 mounted on an outer periphery of a washer 86. The rubber member 88 covers a head portion 84a of the bolt 84.

The rubber member 88 is a high damping rubber (damping member) made of an elastic member having a high damping capability, such as, for example, a low elastic high damping rubber or a high damping rubber material of the polynorbornene system. The rubber member 88 referred to above is of a tubular shape having one end closed and includes a base portion 90 engaged by the washer 86 and a head portion 92 for covering the head portion 84a of the bolt 84. The base portion 90 is formed with an annular groove 90a engaged by the washer 86. A gap G exists between the head portion 84a of the bolt 84 and the head portion 92 of the rubber member 88.

In the next place, a method of assembling the damping unit 72 will be described in detail. At the outset, the bolt 84 is threaded from lateral inside of the motorcycle body into the threaded hole 74a in the damping unit mounting portion 74 of the subframe 4L with the washer 86 intervening therebetween. Subsequently, an outer peripheral edge of the washer 86 is engaged in the groove 90a in the base portion 88a of the rubber member 88 to thereby mount the rubber member 88 on the washer 86. Although the rubber member 88 may be fitted to the head portion 84a of the bolt 84 by means of a baking technique, mounting of the rubber member 88 on the washer 86 is effective to eliminate the use of the baking technique applied to the rubber member 88 and the bolt 84 and, yet, if the position of the washer 86 is displaced in a radial direction, a fine adjustment can be accomplished. Since in this condition the combustion engine E is not mounted, the head portion 92 of the rubber member 88 is, as shown by a double dotted chain line 920, positioned inwardly of the position at which an outer side face 26a of the cylinder block 26 ought to be placed.

Thereafter, the combustion engine E is fixed to the first engine mounting area M1 by means of the bolt 80. As a result, the head portion 92 of the rubber member 88 is urged outwardly by the outer side face 26a of the cylinder block 26 and the rubber member 88 is consequently deformed with its head portion displaced from the position, indicated by the double dotted chain line 920, to the position indicated by the solid line 92. The reason for the rubber member 88 being deformed is because of the presence of the gap G between the head portion 84a of the bolt 84 and the head portion 92 of the rubber member 88, and the widthwise dimension W of the gap G in the motorcycle body widthwise direction is preferably within the range of 3 to 5 mm. As described above, the rubber member 88 is disposed under pressure between the motorcycle body frame assembly FR and the combustion engine E. The head portion 92 of the rubber member 88 is preferably held in contact with a flat surface of the outer side face 26a of the cylinder block 26 and the surface area of contact can be increased accordingly.

In the construction described hereinabove, by the damping unit 72 including the rubber member 88 capable of attenuating the displacement of the to-be-damped portion 76, the vibratory energies from the combustion engine E are absorbed and are then converted into the heat energies of the internal friction in the rubber member 88. As a result, vibrations induced in the to-be-damped portion 76 of the motorcycle body frame assembly FR are suppressed to thereby suppress the generation of the abnormal sounds resulting from the vibrations. Also, the mere provision of the damping unit 72 does not change the rigidity and the mass of the motorcycle body frame assembly FR, and therefore, the feeling during the travel does not lower and the vibration reducing effect can be obtained over the broad range of frequencies other than the resonance frequency.

The subframe 4, which is removably supported at its opposite ends by the main frame 1 shown in FIG. 2, has a low rigidity and the amplitude of the intermediate portion thereof may be apt to increase. However, the amplitude of the subframe 4 is suppressed by the damping unit 72 shown in FIG. 5 and, hence, the generation of the abnormal noises resulting from the vibration of the subframe 4 can be suppressed. Also, even where the degree of freedom of design of the subframe 4 is low in view of the desire to maintain, for example an appearance of the motorcycle or the travel feeling, the vibrating sounds of the subframe 4 can be effectively suppressed.

With the rubber member 88 sandwiched under pressure between the motorcycle body frame assembly FR and the combustion engine E, vibrations induced in the motorcycle body frame assembly F are suppressed. In other words, since the vibrations from the combustion engine E are damped while it is contacted with the combustion engine E, the vibrations induced in the motorcycle body frame assembly FR can be suppressed with a simplified structure. Such an idea has not yet been made available in the past.

Although the combustion engine E referred to in connection with this embodiment makes use of the cylinder block of a structure referred to as the open deck type and is therefore excellent in productivity and cooling capability, the rigidity of the cylinder is low and the vibration may be apt to occur as compared with a combustion engine of a closed deck type. Hence, arrangement has been made that the vibrations induced in the motorcycle body frame assembly FR can be suppressed by the damping unit 72. Also, in this embodiment, the damping unit 72 shown in FIG. 5 is disposed on one side (left side) opposite to the cam chain tunnel in which the cam chain 31 (shown in FIG. 1) is accommodated. Since on the right side where the cam chain tunnel is disposed the transmission of the vibrations from the cylinder block 26 is mitigated, the transmission of the vibrations is considerable on the right side. Accordingly, since the damping unit 72 is disposed on the right side, the vibrations induced in the motorcycle body frame assembly FR can be effectively suppressed.

Another reason for the use of the damping unit 72 on the left subframe 4L is that the bolt 80 on the right first engine mounting area M1 is employed in the form of an adjuster bolt used to adjust the widthwise distance (distance in the leftward and rightward direction) between the combustion engine E and the subframe 4. In other words, since the combustion engine E and the motorcycle body frame assembly FR are connected with each other by means of the adjuster bolt 80, a high priority is given to secure the distance between the combustion engine E and the motorcycle body frame structure FR and, hence, it is difficult to secure a contact dimension between the side face 26a of the cylinder block 26 and the rubber member 88 of the damping unit 72. Accordingly, as far as the distance can be secured between the combustion engine E and the motorcycle body frame assembly FR by any extra means, the damping unit 72 may be provided on both of the left and right subframe 4L and 4R or it may be provided only on the right subframe 4R.

Figure 6:
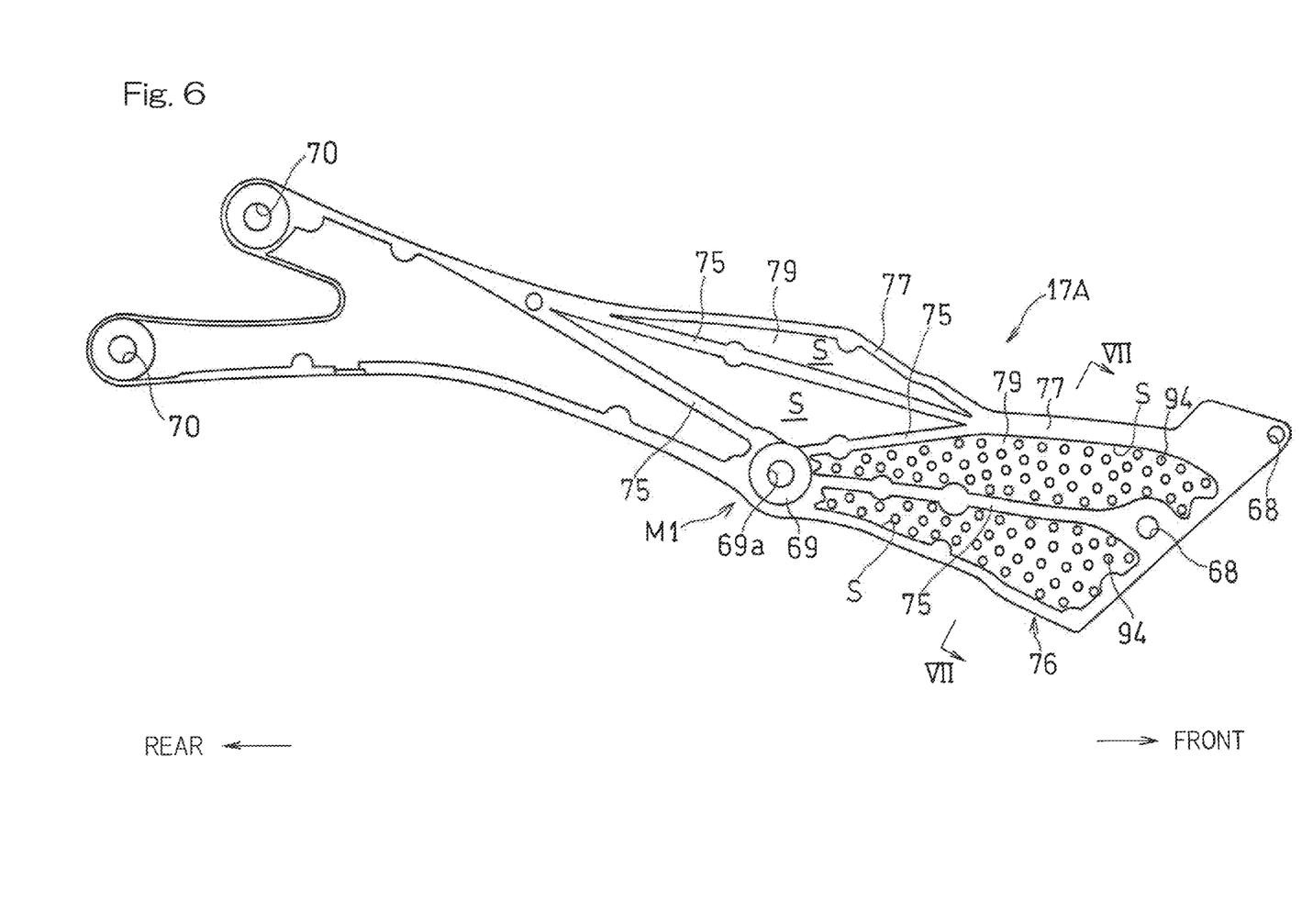
FIG. 6 is a diagram showing a damping unit employed in the motorcycle, which is one kind of the saddle-riding type automotive vehicles according to a second preferred embodiment of the present invention, which diagram illustrates the left subframe in the vehicle body frame assembly of the motorcycle as viewed from laterally inside of the motorcycle.

FIG. 6 illustrates a diagram in which the second subframe piece 17A of the left subframe 4L employed in the motorcycle, which is one kind of the saddle-riding type automotive vehicle according to a second preferred embodiment of the present invention is viewed from inside of the motorcycle body. The second subframe piece 17A is not provided with any damping unit mounting portion 74. Instead thereof, the second subframe piece 17A is of a structure in which particulates 94 capable of moving within the spaces S, which are bound by a reinforcement rib 75, a peripheral wall 77 and a side wall 79, are filled in such spaces S. The particulates 94 are filled only within the spaces S, which correspond to the to-be-damped portion 76 forwardly of the first engine mounting area M1, and are, in the embodiment shown in FIG. 6, employed in the form of steel balls of 5 mm in diameter. It is however to be noted that the particulates 94 may not necessarily limited to the steel balls.

Figure 7:
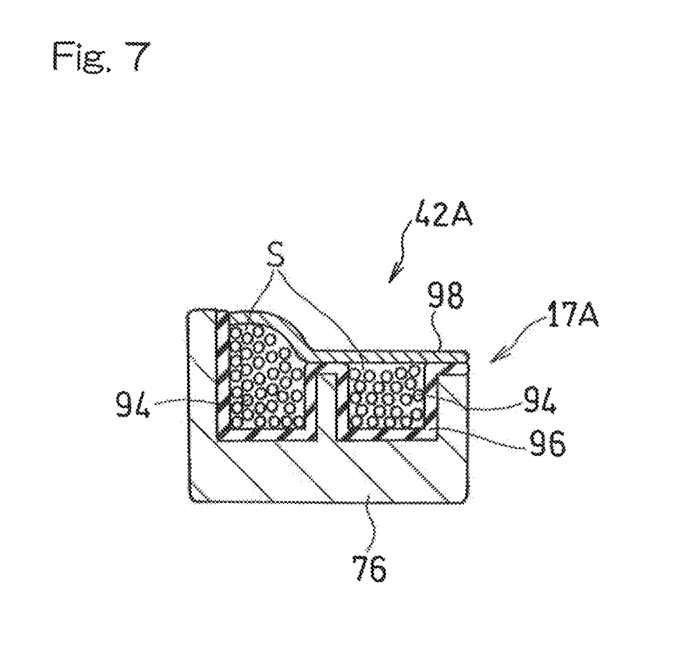
FIG. 7 is a cross sectional view taken along the line VII-VII in FIG. 6.

As shown in FIG. 7, within the spaces S of the to-be-damped portion 76 of the second subframe piece 17A, an interior material 96 comprised of an elastic member such as rubber, which is of a shape following an inner wall surface of the spaces S, is fitted within the spaces S of the to-be-damped portion 76. Thereafter, the particulates 94 are movably filled within the interior material 96 and are closed by a lid member 98 in the form of a plate, made of a steel material, so that some or all of the particulates 94 will not break loose. As described hereinabove, in the practice of the second preferred embodiment, the damping unit 72A is a microparticulate impact damper of a kind which absorbs the vibratory energies from the combustion engine E and then converts them into kinetic energies of the particulates 94 to thereby suppress the vibrations then induced in the to-be-damped portion 76 of the motorcycle body frame assembly FR. It is to be noted that other structural features than the damping unit 72A are substantially similar to those employed in the practice of and described in connection with the previously described first embodiment.

According to the second embodiment described hereinabove, by the damping unit 72A in the form of the microparticulate impact damper, the vibratory energies from the combustion engine E are absorbed and converted into the kinetic energies of the particulates 94. As a result thereof, the vibrations occurring in the to-be-damped portion 76 of the motorcycle body frame assembly FR are suppressed and the generation of the abnormal sounds resulting from the vibrations can therefore be suppressed. Also, since the mere provision of the damping unit 72A does not result in change in rigidity and mass of the motorcycle body frame assembly FR, the feeling during the travel does not lower and, moreover, the vibration reducing effect can be obtained over the wide range of frequencies other than the resonance frequency. In addition, the particulates 94 are stable in performance as compared with that of the rubber and are effective to avoid influences, which would be brought about by change in temperature, humidity and/or aging, thus providing an excellent damping performance.

Furthermore, since in the previously described second embodiment the vibrations can be suppressed in a non-contact state between the damping unit 72A and the combustion engine E, the degree of freedom of arrangement of the damping unit 72A increases. By way of example, the particulates 94 shown in FIG. 7 may be filled within the first subframe piece 15 (shown in FIG. 2) to thereby form the damping unit 72A. Also, the damping unit 72A can be easily disposed on the right side that connects the combustion engine E and the subframe 4R by means of the adjuster bolt referred to hereinbefore.

In describing any one of the first and second embodiments, reference has been made to the use of the damping member 88 and the microparticulate impact damper as the respective damping units, respectively. However, other than those, arrangement may be made that sympathetic vibrations in the vicinity of the resonance frequency may be suppressed by a dynamic vibration absorber. The dynamic vibration absorber is, for example, a spring member. Specifically, when the spring member is provided in the to-be-damped portion 76 of the subframe 4 and is held in contact with a side face of the combustion engine E, vibratory energies from the combustion engine E can be absorbed by the spring member and then converted into spring energies wherefore the vibrations induced in the to-be-damped portion 76 of the motorcycle body frame assembly FR can be suppressed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in describing the foregoing embodiment, the damping unit 72 has been shown and described as provided in the subframe 4, it may be provided in the main frame 1.

Also, although the foregoing embodiment of the present invention has been shown and described as directed to the motorcycle, the present invention is not necessarily limited thereto and is equally applicable to any type of saddle-riding type automotive vehicles such as, for example, a tricycle or a four-wheeled buggy, other than the motorcycle.

Accordingly, such changes and modifications are, unless they depart from the scope of the present invention as delivered from the claims annexed hereto, to be construed as included therein.

REFERENCE NUMERALS

1 . . . Main frame
4L, 4R . . . Subframe
26 . . . Cylinder block 72, 72A ... Damping unit
76 ... To-be-damped region
78 ... Damping member
88 ... Rubber member (Damping member)
94 ... Particulate
E ... Combustion engine
FR ... Motorcycle body frame assembly
M1 ... First engine mounting area
M2 ... Second engine mounting area
M3 ... Third engine mounting area

What is claimed is:

1. A saddle-riding type automotive vehicle having a vehicle combustion engine mounted on an engine mounting area of a vehicle body frame assembly, wherein:
   at a to-be-damped region in the vehicle body frame assembly, which region is not directly in contact with the engine mounting area, a damping unit is provided to absorb vibratory energies from the combustion engine to thereby suppress vibrations of the to-be-damped region.

2. The saddle-riding type automotive vehicle as claimed in claim 1, in which the damping unit makes use of a damping member to damp a displacement of the to-be-damped region to thereby suppress the vibrations occurring in the to-be-damped region.

3. The saddle-riding type automotive vehicle as claimed in claim 1, wherein the vehicle body frame assembly comprises:
   a main frame, which extends from above the combustion engine m a direction rearwardly; and
   a subframe having anteroposterior ends, connected with the main frame, and an intermediate portion which is positioned laterally outside a cylinder block of the combustion engine,
   the engine mounting area is provided in the intermediate portion of the subframe, and
   the damping unit is provided in the subframe.

4. The saddle-riding type automotive vehicle as claimed in claim 1, wherein the damping unit comprises a rubber member having a damping capability; and
   the rubber member is disposed between the vehicle body frame assembly and the combustion engine in a compressed fashion.

5. The saddle-riding type automotive vehicle as claimed in claim 1, wherein the damping unit is a microparticulate impact damper having microparticulates movably filled within the vehicle body frame assembly.

* * * * *